July 7, 1925.

C. E. DRESSLER

MOTOR DRIVEN FAN

Filed Dec. 7, 1920

Inventor
C. E. Dressler.
By his Attorney

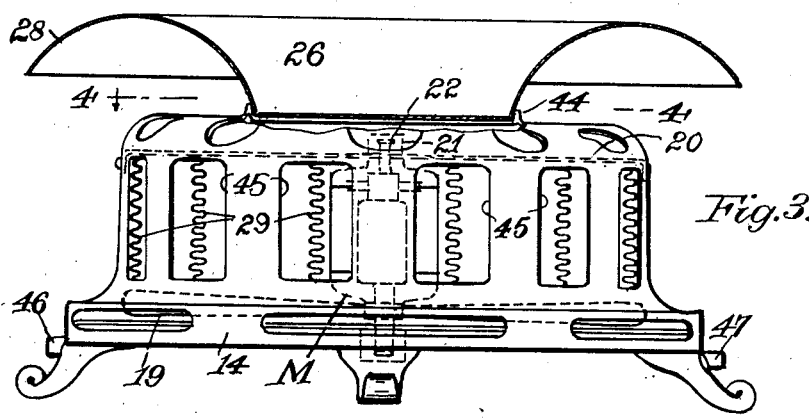
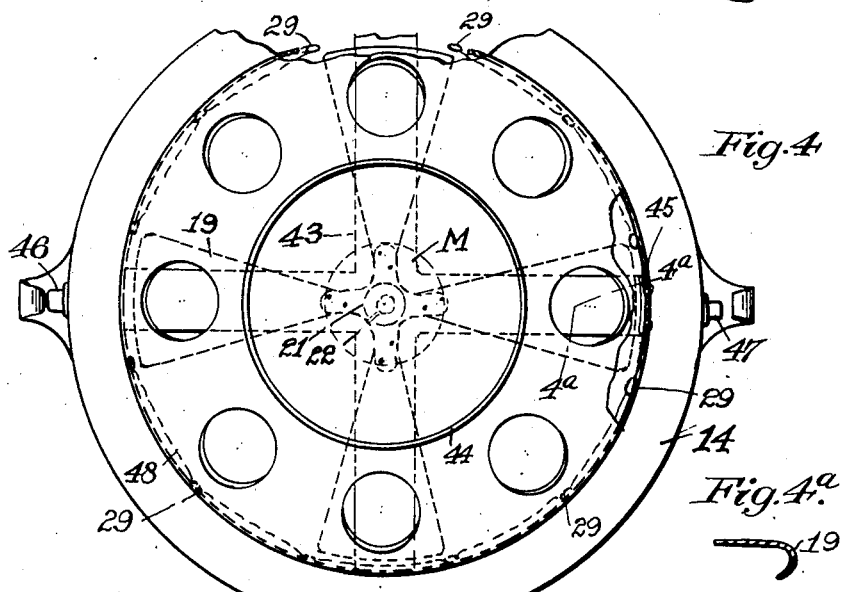
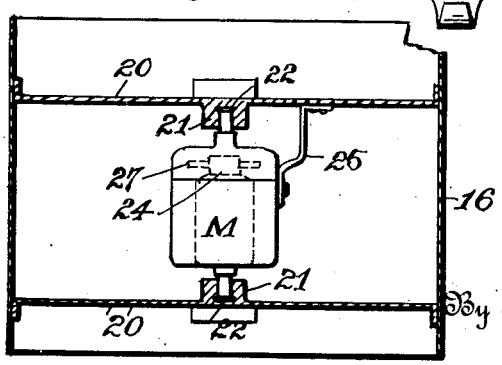
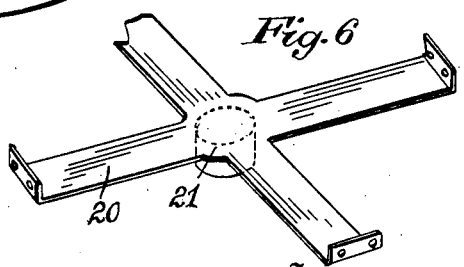

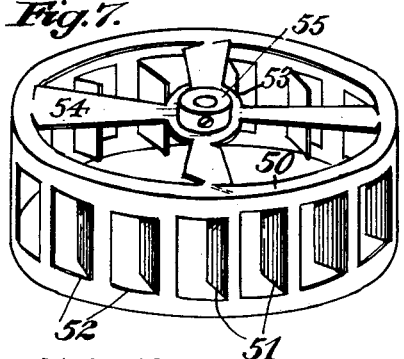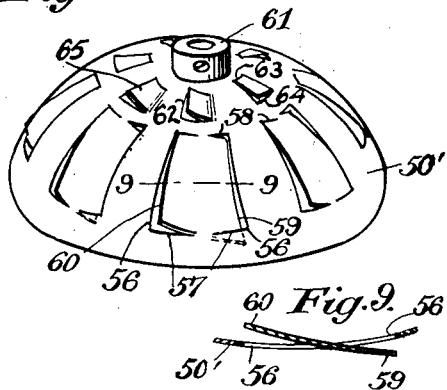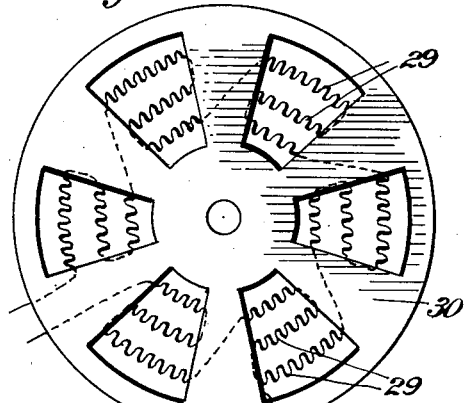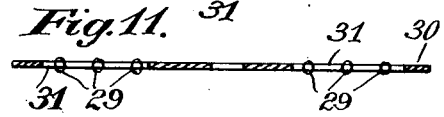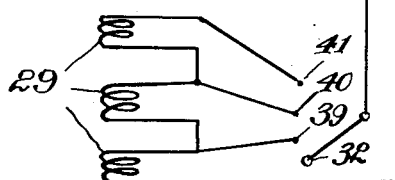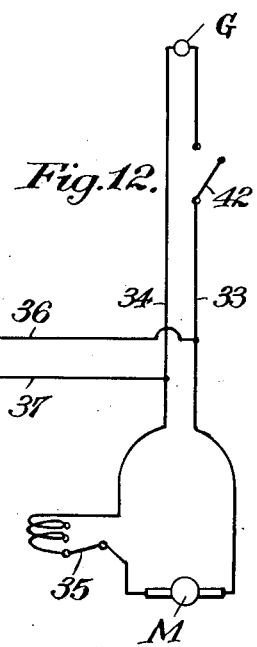

Patented July 7, 1925.

1,544,730

UNITED STATES PATENT OFFICE.

CHARLES E. DRESSLER, OF NEW YORK, N. Y., ASSIGNOR TO CARLOTTA M. DRESSLER, OF NEW YORK, N. Y.

MOTOR-DRIVEN FAN.

Application filed December 7, 1920. Serial No. 429,011.

*To all whom it may concern:*

Be it known that I, CHARLES E. DRESSLER, a citizen of the United States, and a resident of the borough of Manhattan, in the city, county, and State of New York, have invented certain new and useful Improvements in Motor-Driven Fans, of which the following is a specification.

This invention relates to electric motor driven fans, and it is an object of the invention to provide improved means to support the fan to rotate on a vertical axis in a horizontal plane and constructed and arranged to be inverted whereby the air currents may be directed either in an upward or downward direction.

It is a further object of the invention to combine an electric heater with a fan support by connecting in circuit with the electric current conductors for the fan motor one or more current resisting coils and arrange the electric circuit for the fan motor and heater whereby the fan motor and heater may be connected in the electric circuit simultaneously or either may be connected in the electric circuit one independently of the other.

It is a further object of the invention to arrange the fan support to carry a receptacle to carry liquid for evaporation in the atmosphere when the heater is in use, or to serve to carry an article, such as a fern dish or the like, said receptacle being constructed and arranged to deflect and disseminate the air currents laterally from the motor fan.

It is another object of the invention to provide an improved construction and arrangement of fan blades or propeller.

Other objects and advantages will hereinafter appear.

In the drawings accompanying and forming a part of this specification. Figure 1 is a sectional side elevation showing an embodiment of my improved mounting for the electric motor driven fan and electric heater combined therewith.

Figure 3 is a side elevation showing a modified arrangement of the heating coils and a modified form of the enclosing casing for the motor fan.

Figure 4 is a plan view taken on the line 4—4 of Figure 3.

Figure 4ª is a longitudinal sectional view of a tip portion of a fan blade.

Figure 5 is a sectional side elevation of the motor fan enclosing casing and showing the manner of mounting the motor fan therein.

Figure 6 is a perspective view, partly broken away, of one of the motor fan supports in the casing.

Figures 7 and 8 are perspective views of modified forms of propellers for motor driven fans.

Figure 9 is a sectional detail view taken on the line 9—9 of Figure 8.

Figure 1:
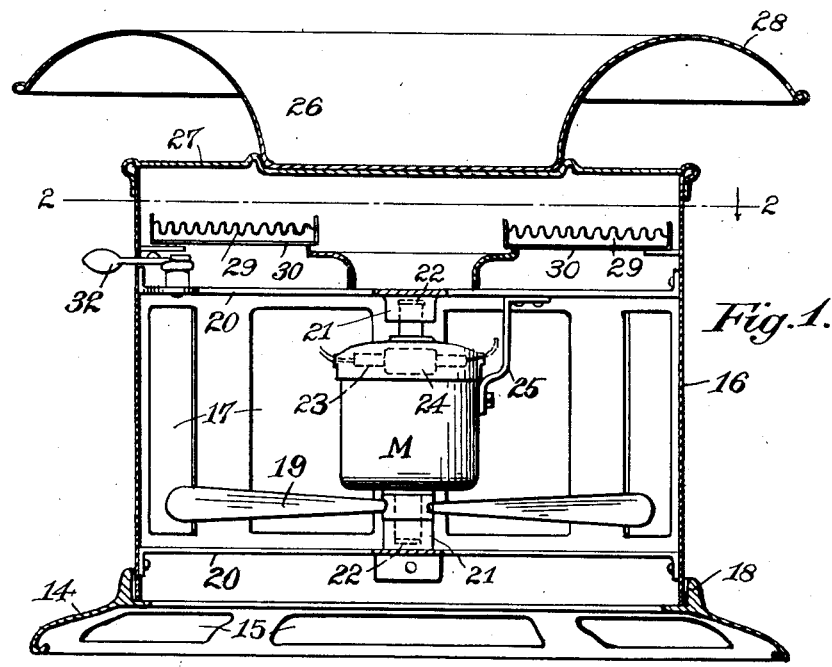
Figure 2:
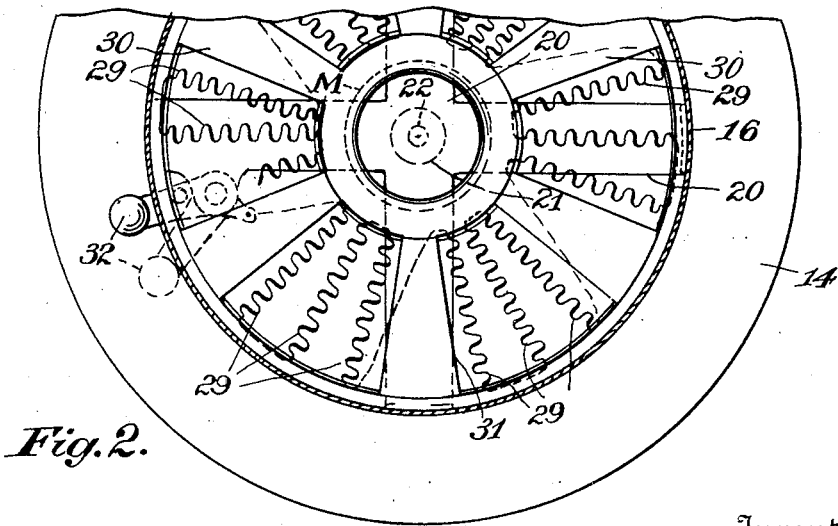
Figure 2 is a sectional view taken on the line 2—2 of Figure 1.

Figure 10 is a plan view of a carrier for the heater coils shown in Figures 1 and 2 and showing a modified arrangement of the heater coils.

Figure 11 is a sectional end elevation of the heater coil carrier shown in Figure 10, and Figure 12 is a diagrammatic view of the electric circuit for the motor fan and heater coils.

Similar characters of reference designate like parts throughout the different views of the drawings.

The embodiment of my invention as shown in Figure 1 comprises an annular base 14 having circularly arranged openings 15. A cylindrical open end casing 16 having circumferentially disposed opening 17 is adapted to be removably supported upon the base within the annular flange 18 to prevent lateral displacement of said casing and whereby the casing through the base may be supported in a horizontal position and be in the nature of a tablepiece.

An electric motor, designated in a general way by M, having fan blades or vanes 19 fixed to the shaft thereof, is mounted axially in the casing to rotate on a vertical axis by means of brackets or spiders 20 (Figure 6) fixed to the inner wall of the casing, each spider having a boss 21 axially thereof in which the opposite ends of the motor shaft are journalled by step bearings 22, the field magnets or stator member of the motor having brushes 23 to co-operate with the commutator 24. The motor is supported in fixed position by a bracket or brackets 25. The fan tip portions of the vanes or blades are bent or curved backwardly as shown in longitudinal section in Figure 4ª so that during the revolving thereof by the motor they will facilitate the drawing of air through the openings 15 in the casing and direct the air blast or currents in a line with the axis of the motor, and as viewed in Figure 1 in an upward direction. By the removably supporting of the motor fan casing 16 upon the base 14 said casing may be readily inverted and through the construction and arrangement of the motor fan the air currents are directed downward and as they strike against the support for the base are deflected laterally through the openings 15.

To direct the air currents or blast from the fan laterally when such blast is directed upwardly as hereinbefore set forth a deflector 26 is provided, which is in the form of a dished member to constitute a receptacle to contain water to be evaporated into the air or to carry an article, such as a fern dish or incense burner, to thereby enhance the appearance of the motor casing. This deflector is mounted upon an open end of the fan casing by a grid 27 which may be constructed integral with the deflector or to be separable therefrom, with openings or perforations in the grid between the wall of the fan casing and the dished portion of the deflector. The side wall of the dished portion of the deflector flares out laterally from the perforated portion of the grid and the wall of the fan casing as clearly shown at 28 in Figure 1. By this arrangement the air blast from the motor fan which is directed against said flaring portion of the deflector is not only directed laterally but also in a downward direction and tending to distribute the air in all directions. The fan motor is connected in circuit with a suitable source of electricity and arranged with the usual starting rheostat switch to vary the flow of current to the fan motor and thereby vary the speed thereof, or to cut the fan motor out of circuit with the source of electricity.

An electric heater in the form of series of circularly arranged current resisting wire coils 29 are disposed in the path of the air blast from the motor fan and interposed between said fan and the deflector 26, whereby the heat radiated from said coils or the air heated thereby is directed against the deflector and from the latter distributed laterally. These heater coils are carried by a plate 30 (Figure 10) of non-conducting, heat resisting and uninflammable material, such as asbestos, mounted in the motor casing 16 with the coils extending across the circularly arranged openings 31. These coils as shown in Figure 1 may extend radially across the openings in the plate 30, or may extend transversely thereof as shown in Figure 10. The heating coils 29 are connected in the circuit for the motor fan and a switch 32 is provided whereby to cut one or more or all of the coils out of circuit with the source of electricity whereby the motor may be connected in circuit with the source of electricity independent of the heating coils, and vice versa.

In Figure 12 there is shown in a diagrammatic manner the electric circuit for the fan motor M and heating coils 29 with a source of electricity shown in a general way as a generator G. The fan motor is connected in circuit with the source of electricity by wires 33, 34 and a rheostat switch for opening and closing the circuit for the fan motor and to vary the flow of current thereto is indicated at 35. The coils of the heater 29 are electrically connected in series in circuit with the wires 33, 34 leading from the generator by branch wires 36, 37. The coils are normally cut out of circuit by switch 32 engaging a dead contact 38. The respective coils of the heater are connected in series with a series of contacts 39, 40, 41 with which the switch 32 is adapted to cooperate to connect one or more of the coils in the circuit. By this arrangement two or all of the heating coils may be connected in circuit independent of the motor fan, or the motor fan may be cut out from the circuit independent of the heater. A switch 42 may be provided to open the circuit and cut out both the fan motor and heater from the source of electricity.

In Figures 3 and 4 I have shown a modified form of the motor casing 14 and arrangement of the heating coils 29. The motor casing is of inverted dished formation arranged with feet to support the same in horizontal position, the motor M being rotatably supported axially thereby by journalling the same in a hub portion of a spider 43, similar to the spiders 20, fixed at the open end of the casing and a hub axially at the closed end of the casing. The deflector 26 is seated within an annular flange 44 at the closed end of the casing with the flaring portion 28 thereof extending from a series of circularly arranged perforations for the passage of the air blast or currents from the motor fan. A series of openings 45 are provided in the side wall of the casing and the heating coils 29 are arranged to extend in a direction parallel with the axis of the casing and preferably extending across the openings 45. The switches for opening and closing the circuits of the fan motor and heater coils are controlled by push buttons 46, 47 arranged in the base of the casing and at opposite sides thereof. The coils 29 are connected in series by wire 48.

In Figures 7 and 8 I have shown modified forms of fans for creating an air blast. In the structure shown in Figure 7 an annular member 50 is provided the side wall of which is substantially parallel with the axis thereof and has circumferentially disposed portions stamped therefrom with such portions bent laterally, shown as bent inwardly to provide a series of vanes 51 and openings 52. Portions of the end are stamped therefrom to provide a circular axial portion 53 and radially extending portions 54 arranged in the form of blades with the leading edge bent upwardly and the rear edge curved downwardly. The axial portion 53 is arranged with a hub 55 whereby to mount the same upon the shaft of a motor.

In the structure shown in Figure 8 a dished member 50' of curved shape in cross section is provided with radial incisions 56 and having portions 57, 58 at right angles to the radial incisions. The material between the incisions 56, 57 and 58 is bent or twisted so that one portion, as at 59, projects inwardly and the opposite portion 60 will project outwardly. The member 50' is provided with a hub 61 axially thereof to mount the same upon the shaft of a motor. Arranged around said hub is a series of incisions having a radial portion 62 and circular portions 63, 64 with the material between such incisions bent and curved upwardly to form vanes 65.

Having thus described my invention I claim:

1. The combination of a base, an electric motor driven fan arranged to direct an air blast in line with the axis of the motor, and a casing in which the fan motor is rotatably mounted and adapted to be adjustably supported upon the base whereby to direct the air blast from the fan outward from the base or in a direction toward the base.

2. The combination of an electric motor driven fan arranged to direct an air blast in a direction with the axis of the fan, a perforated base, a cylindrical perforated casing in which the fan motor is rotatably mounted axially thereof, said casing being adapted to be supported upon the base whereby the air blast may be directed outward from the base or in a direction toward the base and through the perforations therein, and means removably mounted upon the casing to deflect the air blast laterally and in a direction toward the base when the motor casing is mounted on the base to cause the fan to direct the air blast outwardly from the base.

3. The combination with an electric motor driven fan arranged to direct an air blast in line with the axis of the motor, of a cylindrical open end casing having circumferentially arranged openings; means to rotatably mount the fan motor in the casing axially thereof; a perforated base to removably support the casing; a grid mounted upon one end of the casing; and a deflector mounted upon the grid to direct the air blast from the motor fan laterally and arranged as a receptacle.

4. The combination of a hollow base having perforations in the wall thereof; a cylindrical open end casing having circumferential openings in the wall thereof adapted to be mounted upon the base; a fan carrying motor; means to rotatably support said fan motor axially in the casing, said fan being arranged to direct an air blast in a line with the axis of the motor; electric heating coils; a carrier for said coils of non-conducting and heat resisting material mounted in said casing in the path of the air blast from the fan and a deflector arranged at the outer end of the casing to direct the air from the fan laterally and rearwardly of the direction in which the blast is directed by the fan; said deflector being arranged to support an article from the casing or to support the casing.

5. The combination of a perforated hollow base; a cylindrical open end casing having perforations in the wall thereof adapted to be supported at either end upon the base; a fan carrying motor rotatably mounted axially in the casing; said fan being arranged to direct an air blast in a line with the axis of the motor; a source of electricity with which the motor is connected in circuit; means in the electric circuit to open and close the circuit for the motor fan and vary the flow of current thereto; a deflector arranged to be removably supported at the end of the casing opposite to the base to direct the air currents from the fan laterally; and heating coils mounted in the end of the casing in the path of the air blast delivered by the fan connected in electric circuit with the source of electricity and the motor circuit; and a switch to open and close the circuit for said heating coils for the purpose specified.

Signed at New York city, in the county of New York and State of New York this 11th day of November, 1920.

CHARLES E. DRESSLER.